United States Patent
Lee et al.

(10) Patent No.: US 12,127,130 B2
(45) Date of Patent: Oct. 22, 2024

(54) METHOD AND DEVICE FOR DETERMINING SIDELINK TRANSMISSION POWER IN NR V2X

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 17/638,462

(22) PCT Filed: Aug. 25, 2020

(86) PCT No.: PCT/KR2020/011325
§ 371 (c)(1),
(2) Date: Feb. 25, 2022

(87) PCT Pub. No.: WO2021/040383
PCT Pub. Date: Mar. 4, 2021

(65) Prior Publication Data
US 2022/0361111 A1    Nov. 10, 2022

Related U.S. Application Data

(60) Provisional application No. 62/891,941, filed on Aug. 26, 2019.

(51) Int. Cl.
*H04W 52/14* (2009.01)
*H04L 1/1812* (2023.01)
(Continued)

(52) U.S. Cl.
CPC ........... *H04W 52/10* (2013.01); *H04L 1/1812* (2013.01); *H04W 52/14* (2013.01);
(Continued)

(58) Field of Classification Search
None
See application file for complete search history.

(56) References Cited

U.S. PATENT DOCUMENTS

| 11,570,726 B2* | 1/2023 | Wu .................... H04W 52/242 |
| 2017/0188391 A1* | 6/2017 | Rajagopal ......... H04W 74/0816 |

(Continued)

FOREIGN PATENT DOCUMENTS

| WO | 2017034258 A1 | 3/2017 | |
| WO | WO-2019195138 A1 * | 10/2019 | ........ H04W 28/0252 |

OTHER PUBLICATIONS

Samsung, "On Sidelink Power Control", R1-1906950, 3GPP TSG RAN WG1 #97, May 3, 2019, See pp. 1-3, 7-8.

(Continued)

*Primary Examiner* — Kodzovi Acolatse
(74) *Attorney, Agent, or Firm* — BRYAN CAVE LEIGHTON PAISNER LLP

(57) ABSTRACT

According to an embodiment of the present disclosure, provided is a method for a first device to perform sidelink communication. The method may include the steps of: determining sidelink transmission power, for transmission to a second device, as first transmission power on the basis of an OLPC parameter and at least one parameter pertaining to SL PL; transmitting a first PSCCH or a first PSSCH to the second device on the basis of the first transmission power; determining the sidelink transmission power as second transmission power on the basis of a transmission power control operation for the first transmission power being triggered; and transmitting a second PSCCH or a second PSSCH to the second device on the basis of the second transmission power.

12 Claims, 26 Drawing Sheets

(51) Int. Cl.
*H04W 52/10* (2009.01)
*H04W 52/24* (2009.01)
*H04W 72/02* (2009.01)
*H04W 72/20* (2023.01)

(52) U.S. Cl.
CPC ......... *H04W 52/242* (2013.01); *H04W 72/02* (2013.01); *H04W 72/20* (2023.01)

(56) References Cited

U.S. PATENT DOCUMENTS

| | | | |
|---|---|---|---|
| 2017/0295585 A1 | 10/2017 | Sorrentino et al. | |
| 2018/0176892 A1* | 6/2018 | Kim | H04W 52/04 |
| 2018/0288716 A1* | 10/2018 | Ghim | H04W 52/48 |
| 2019/0069200 A1* | 2/2019 | Zhang | H04W 72/20 |
| 2020/0205166 A1* | 6/2020 | Huang | H04W 76/27 |
| 2020/0228247 A1* | 7/2020 | Guo | H04W 52/383 |
| 2021/0022084 A1* | 1/2021 | Jiang | H04W 52/383 |
| 2021/0022091 A1* | 1/2021 | Li | H04W 52/242 |
| 2021/0136699 A1* | 5/2021 | Scholand | H04W 52/242 |
| 2021/0235395 A1* | 7/2021 | Zhang | H04B 7/0632 |
| 2021/0307023 A1* | 9/2021 | He | H04W 72/044 |
| 2022/0095281 A1* | 3/2022 | Zhao | H04W 72/542 |
| 2022/0110069 A1* | 4/2022 | Wang | H04W 52/146 |
| 2022/0110075 A1* | 4/2022 | Zhao | H04W 52/383 |
| 2022/0225353 A1* | 7/2022 | Peng | H04L 5/0053 |
| 2023/0014784 A1* | 1/2023 | Yao | H04L 25/0226 |

OTHER PUBLICATIONS

Mediatek Inc., "Discussion on V2X Physical Layer Procedure", R1-1906558, 3GPP TSG RAN WG1 #97, May 4, 2019, See Sections 2.1, 3.1.2.

Huawei, "Power Control and Power Sharing for V2X Sidelink", R1-1906598, 3GPP TSG RAN WG1 Meeting #97, May 3, 2019, See Section 2.

* cited by examiner

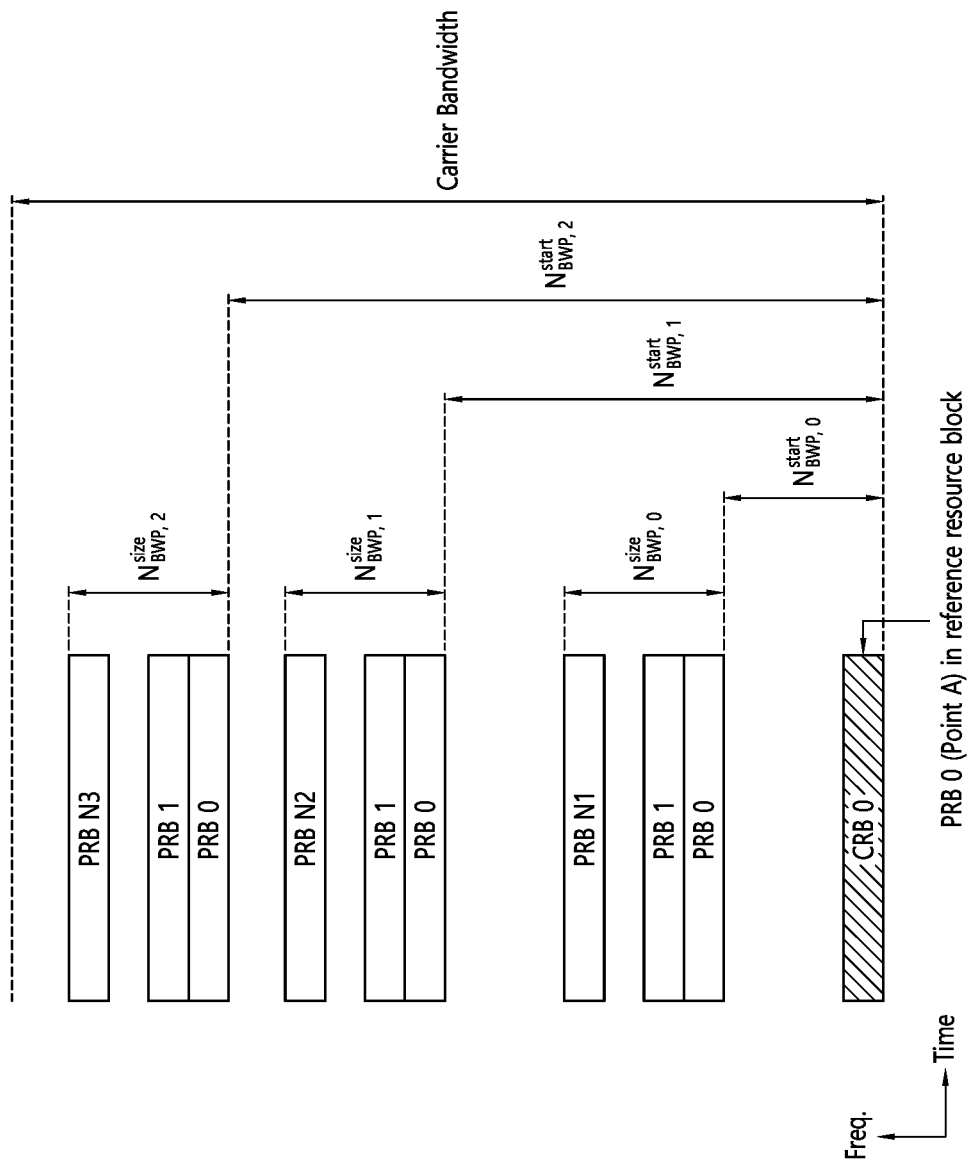

● : TX UE
◐ : RX UE

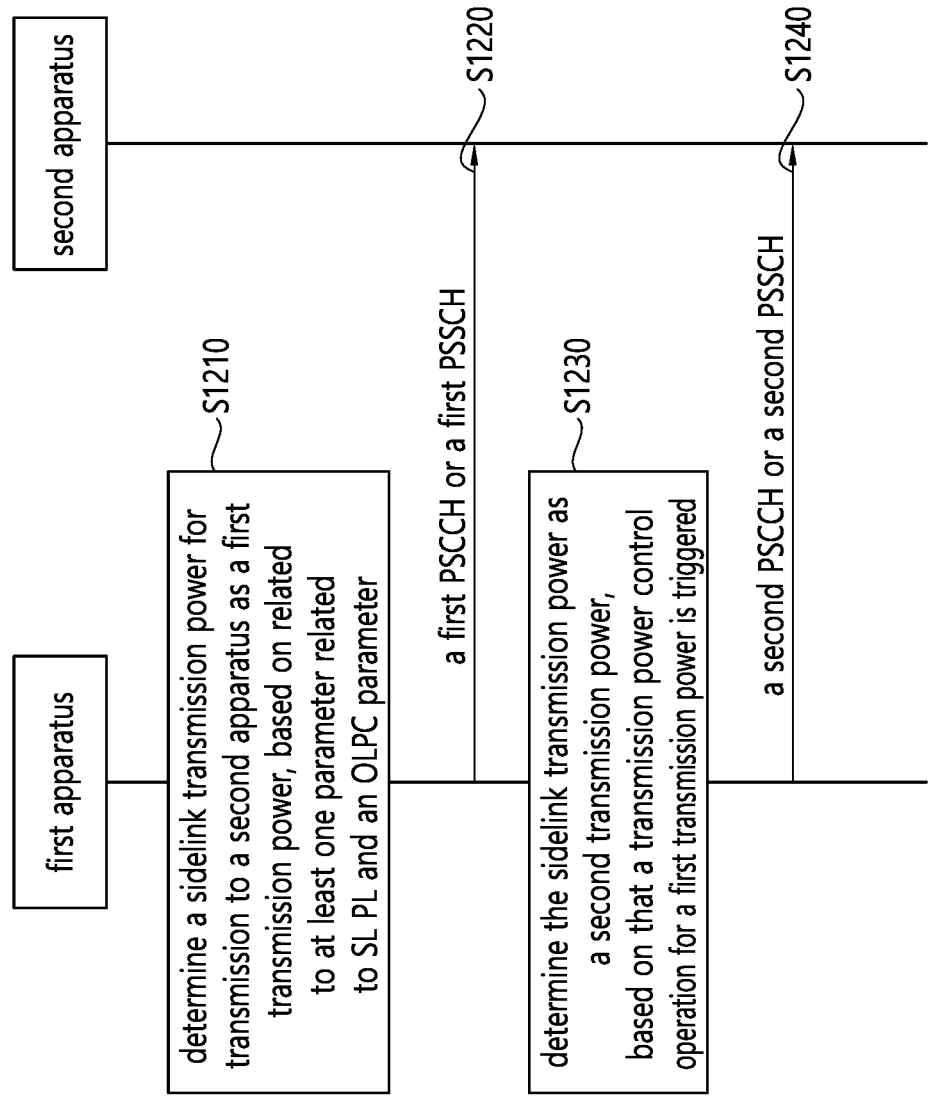

METHOD AND DEVICE FOR DETERMINING SIDELINK TRANSMISSION POWER IN NR V2X

CROSS-REFERENCE TO RELATED APPLICATIONS

This application is the Continuation Bypass of International Application No. PCT/KR2020/011325, filed on Aug. 25, 2020, which claims the benefit of U.S. Provisional Application No. 62/891,941, filed on Aug. 26, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

An object of the present disclosure is to provide a sidelink (SL) communication method between apparatuses (or UEs) and an apparatus (or UE) for performing the same.

Another technical problem of the present disclosure is to provide a method for determining sidelink transmission power in NR V2X and an apparatus (or UE) for performing the same.

Technical Solutions

According to an embodiment of the present disclosure, a method for a first apparatus to perform sidelink communication may be provided. The method may comprise: determining a sidelink transmission power for transmission to a second apparatus as a first transmission power, based on an open-loop power control (OLPC) parameter and at least one parameter related to sidelink (SL) pathloss (PL); transmitting a first physical sidelink control channel (PSCCH) or a first physical sidelink shared channel (PSSCH) to the second apparatus, based on the first transmission power; determining the sidelink transmission power as a second transmission power, based on that a transmission power control operation for the first transmission power is triggered; and transmitting a second PSCCH or a second PSSCH to the second apparatus, based on the second transmission power.

According to an embodiment of the present disclosure, a first apparatus for performing sidelink communication may be proposed. The first apparatus may comprise: one or more memories storing instructions; one or more transceivers; and one or more processors connected to the one or more memories and the one or more transceivers, wherein the one or more processors execute the instructions to: determine a sidelink transmission power for transmission to a second apparatus as a first transmission power, based on an open-loop power control (OLPC) parameter and at least one parameter related to sidelink (SL) pathloss (PL); transmit a first physical sidelink control channel (PSCCH) or a first physical sidelink shared channel (PSSCH) to the second apparatus, based on the first transmission power; determine the sidelink transmission power as a second transmission power, based on that a transmission power control operation for the first transmission power is triggered; and transmit a second PSCCH or a second PSSCH to the second apparatus, based on the second transmission power.

According to an embodiment of the present disclosure, an apparatus (or a chip(set)) configured to control a first user equipment (UE) may be proposed. The apparatus may comprise: one or more processors; and one or more memories operably connectable to the one or more processors and storing instructions, wherein the one or more processors execute the instructions to: determine a sidelink transmission power for transmission to a second UE as a first transmission power, based on an open-loop power control (OLPC) parameter and at least one parameter related to sidelink (SL) pathloss (PL); transmit a first physical sidelink control channel (PSCCH) or a first physical sidelink shared channel (PSSCH) to the second UE, based on the first transmission power; determine the sidelink transmission power as a second transmission power, based on that a transmission power control operation for the first transmission power is triggered; and transmit a second PSCCH or a second PSSCH to the second UE, based on the second transmission power.

According to an embodiment of the present disclosure, a non-transitory computer-readable storage medium storing instructions may be proposed. The instructions may, when executed, cause a first apparatus to: determine a sidelink transmission power for transmission to a second apparatus as a first transmission power, based on an open-loop power control (OLPC) parameter and at least one parameter related to sidelink (SL) pathloss (PL); transmit a first physical sidelink control channel (PSCCH) or a first physical sidelink shared channel (PSSCH) to the second apparatus, based on the first transmission power; determine the sidelink transmission power as a second transmission power, based on that a transmission power control operation for the first transmission power is triggered; and transmit a second PSCCH or a second PSSCH to the second apparatus, based on the second transmission power.

According to an embodiment of the present disclosure, a method for a second apparatus to perform sidelink communication may be provided. The method may comprise: receiving a first physical sidelink control channel (PSCCH) or a first physical sidelink shared channel (PSSCH) based on a first transmission power, from a first apparatus; transmitting a physical sidelink feedback channel (PSFCH) related to the first PSCCH or the first PSSCH, to the first apparatus; and receiving a second PSSCH or a second PSSCH relate to a second transmission power, from the first apparatus, wherein the first transmission power is determined by the first apparatus based on an open-loop power control (OLPC) parameter and at least one parameter related to sidelink (SL) pathloss (PL), and wherein the second transmission power is determined by the first apparatus based on that a transmission power control operation for the first transmission power is triggered.

According to an embodiment of the present disclosure, a second apparatus for performing sidelink communication may be proposed. The second apparatus may comprise: one or more memories storing instructions; one or more transceivers; and one or more processors connected to the one or more memories and the one or more transceivers, wherein the one or more processors execute the instructions to: receive a first physical sidelink control channel (PSCCH) or a first physical sidelink shared channel (PSSCH) based on a first transmission power, from a first apparatus; transmit a physical sidelink feedback channel (PSFCH) related to the first PSCCH or the first PSSCH, to the first apparatus; and receive a second PSSCH or a second PSSCH relate to a second transmission power, from the first apparatus, wherein the first transmission power is determined by the first apparatus based on an open-loop power control (OLPC) parameter and at least one parameter related to sidelink (SL) pathloss (PL), and wherein the second transmission power is determined by the first apparatus based on that a transmission power control operation for the first transmission power is triggered.

EFFECTS OF THE DISCLOSURE

According to the present disclosure, sidelink communication between apparatuses (or UEs) can be efficiently performed.

BRIEF DESCRIPTION OF THE DRAWINGS

FIG. 7 shows an example of a BWP, based on an embodiment of the present disclosure.

FIG. 12 shows a method for determining transmission power by a first apparatus according to an embodiment of the present disclosure.

DESCRIPTION OF EXEMPLARY EMBODIMENTS

Figure 1:
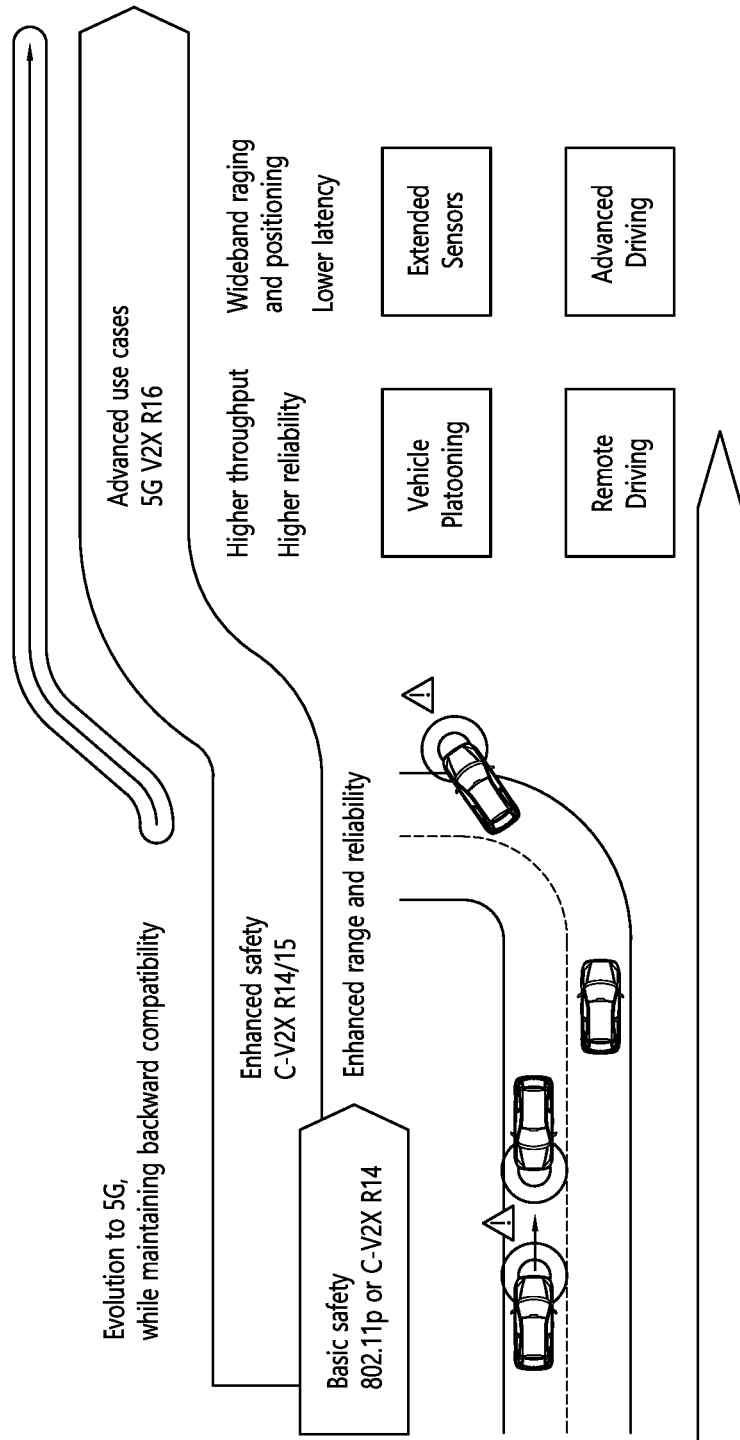
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
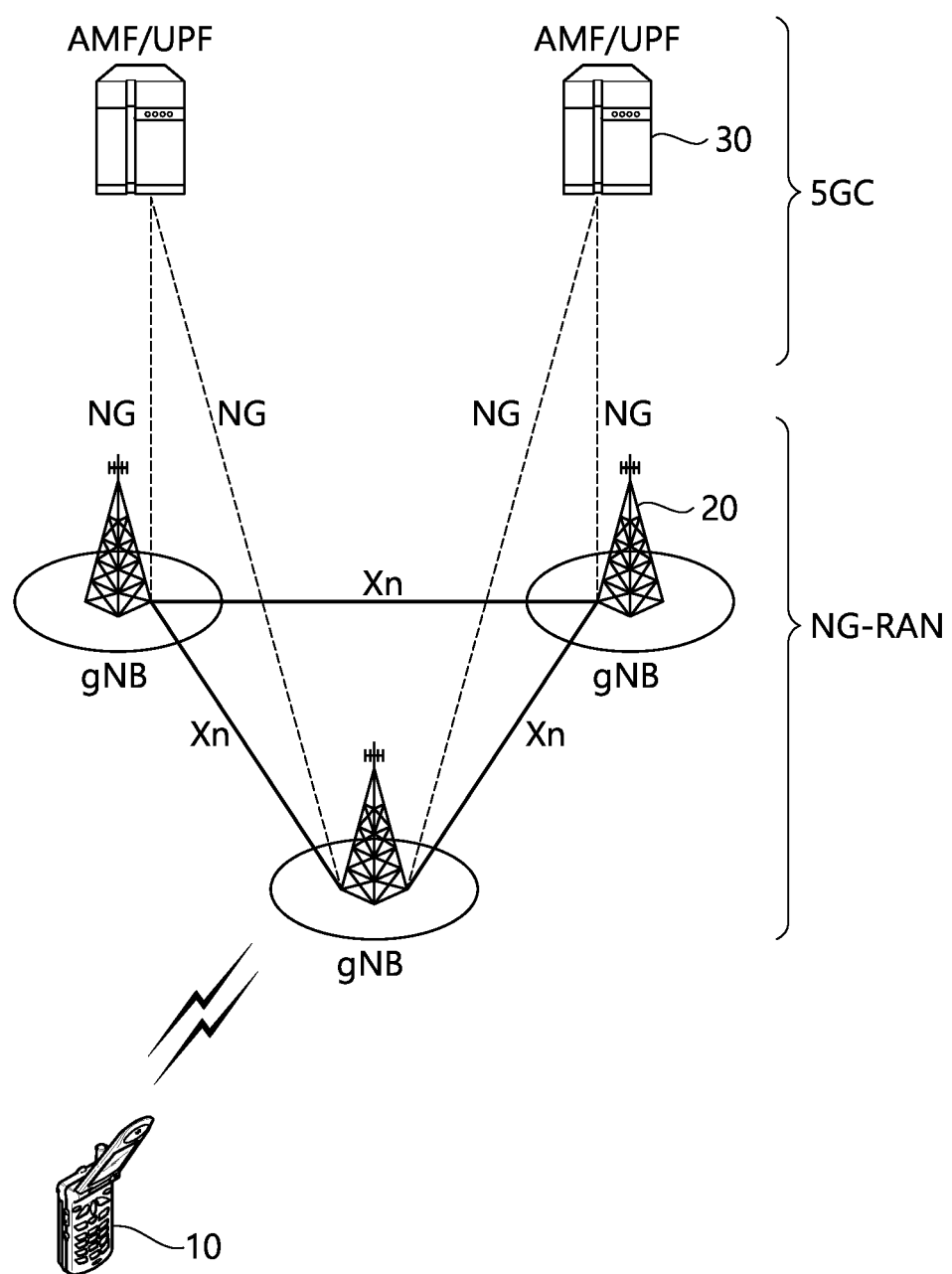
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
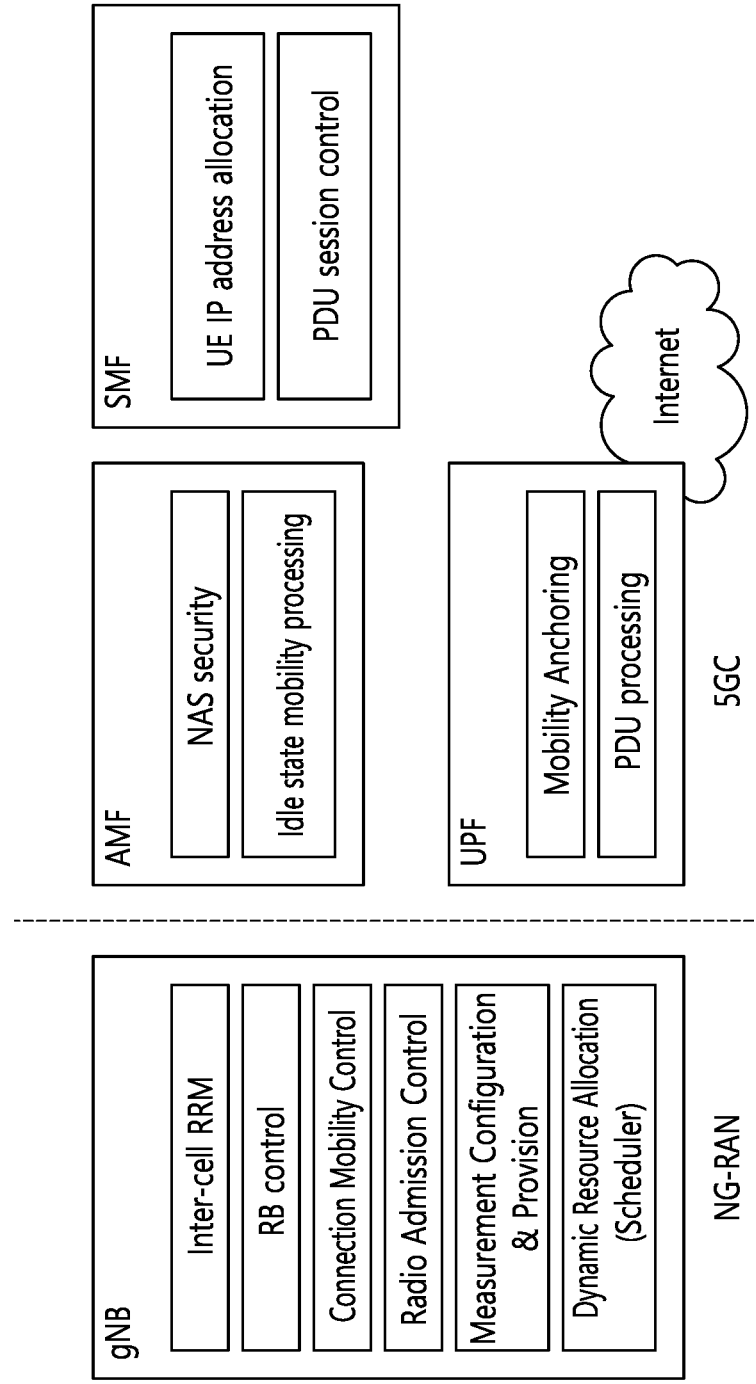
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
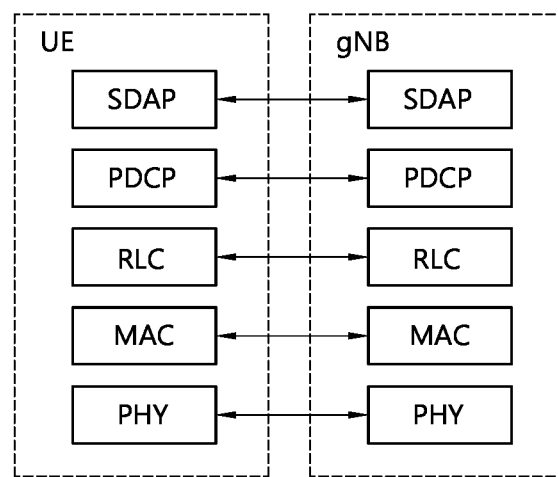
FIGS. 4A and 4B show a radio protocol architecture, based on an embodiment of the present disclosure.
Figure 4B:
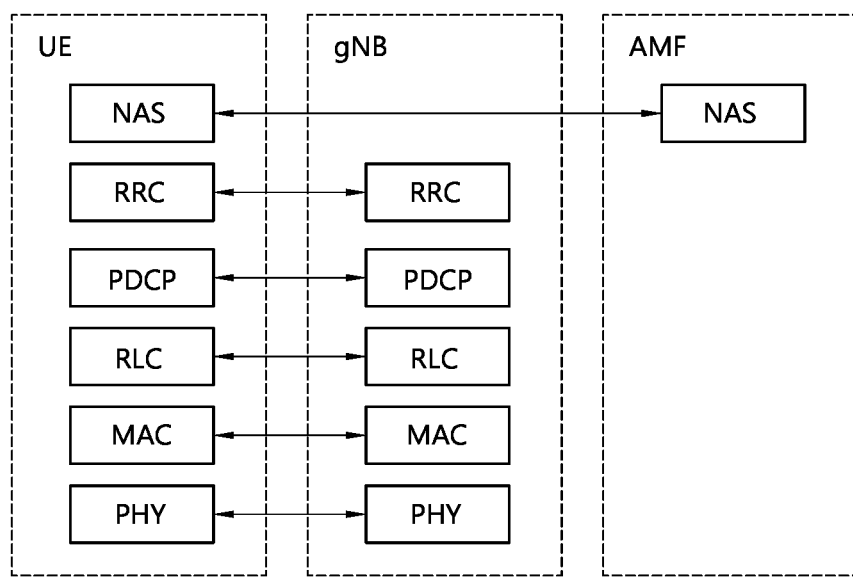

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
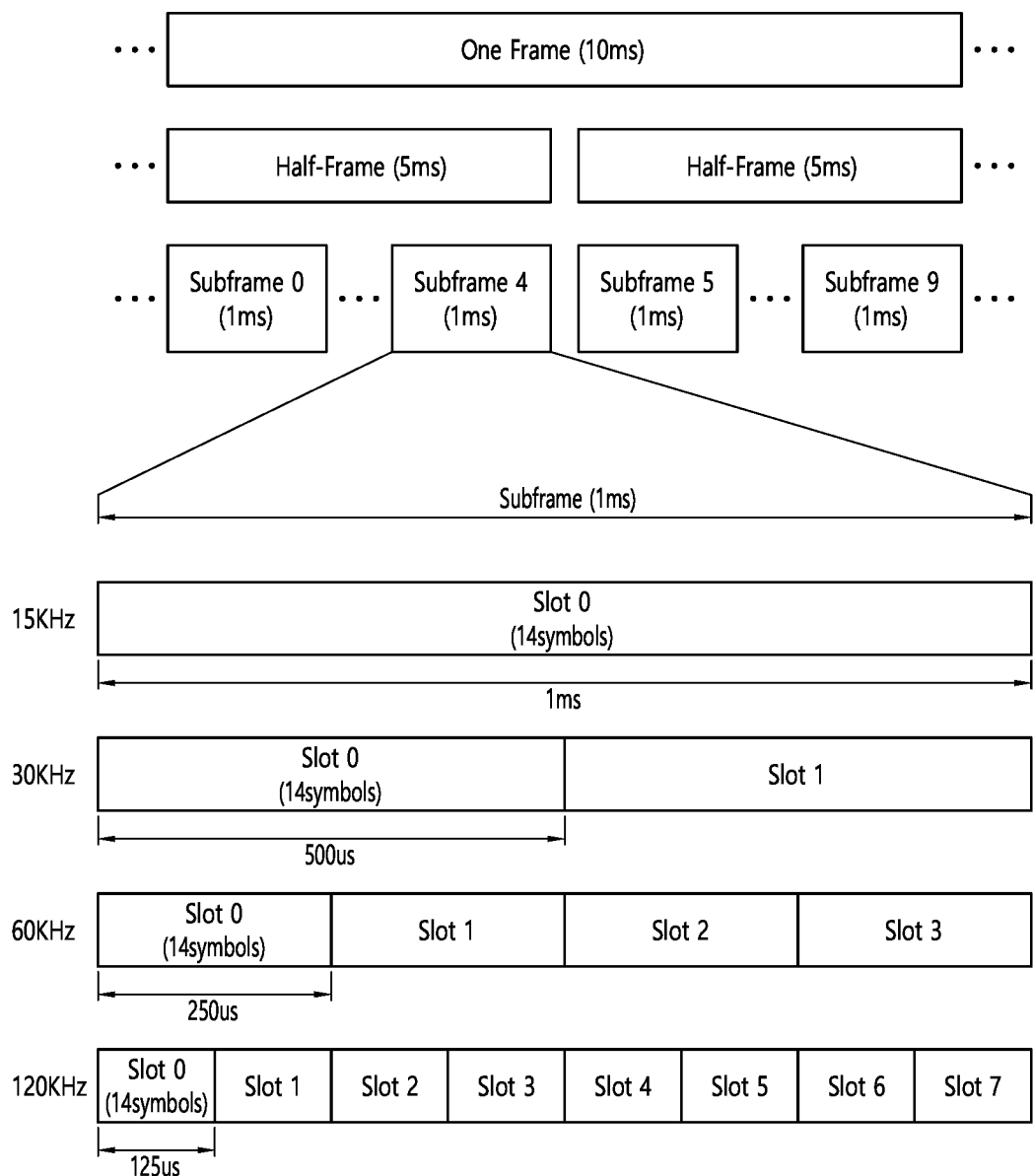
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
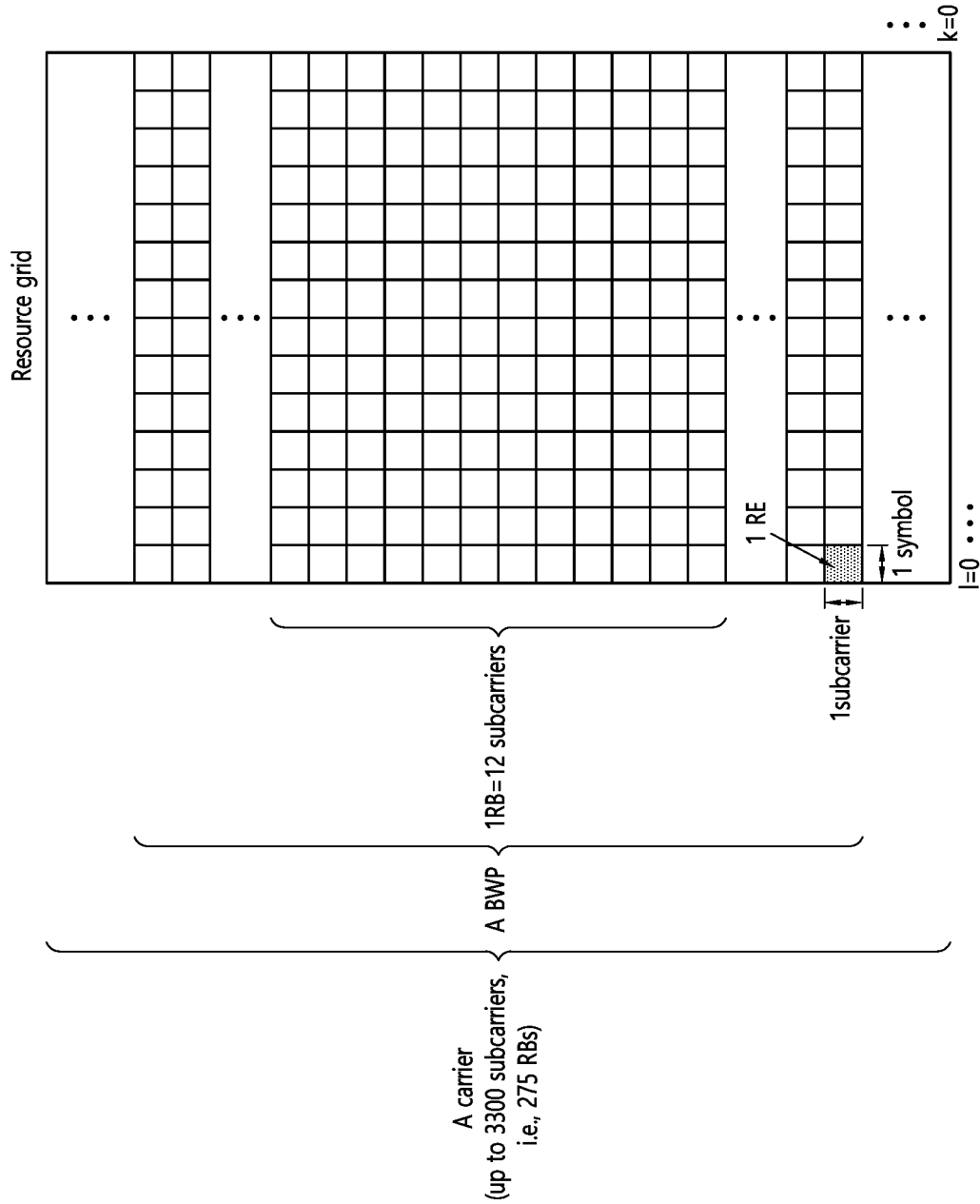
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
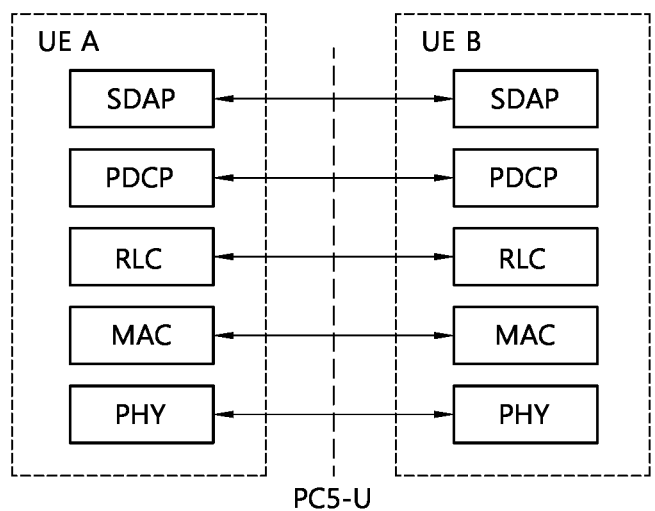
FIGS. 8A and 8B show a radio protocol architecture for a SL communication, based on an embodiment of the present disclosure.
Figure 8B:
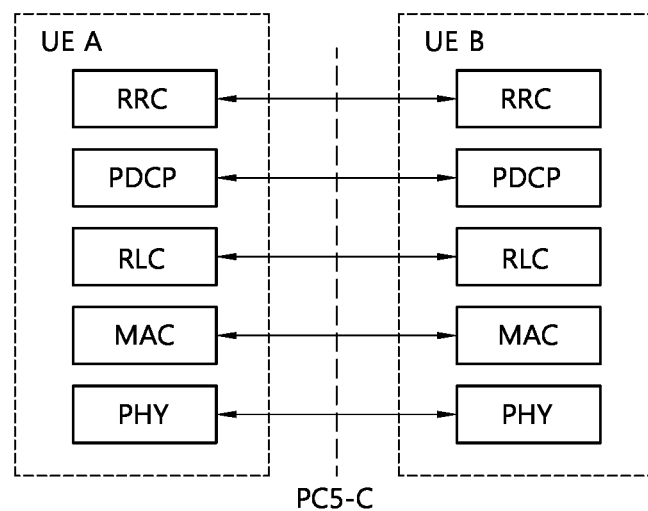

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
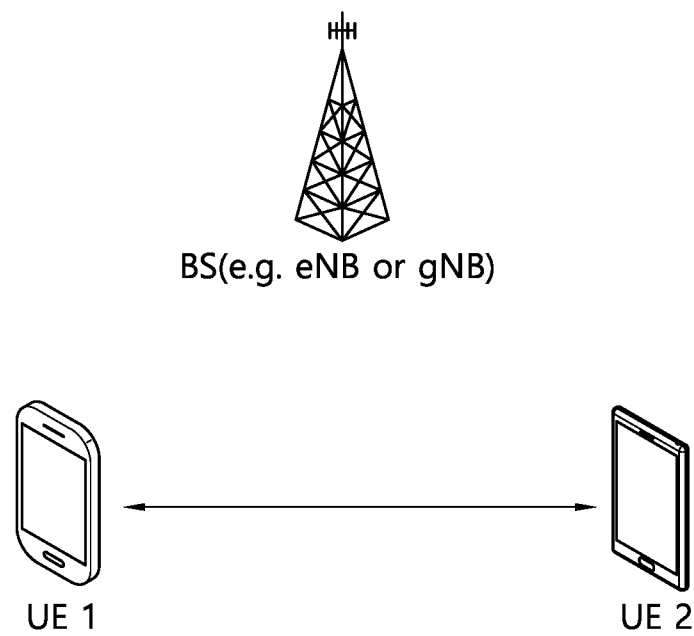
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
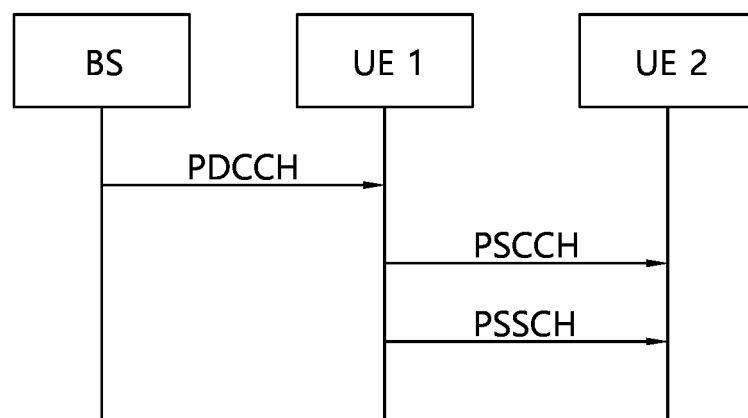
FIGS. 10A and 10B show a procedure of performing V2X or SL communication by a UE based on a transmission mode, based on an embodiment of the present disclosure.
Figure 10B:
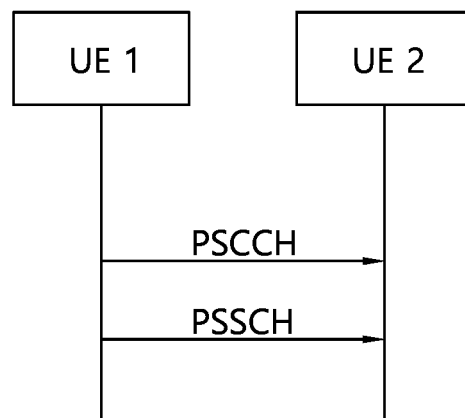

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
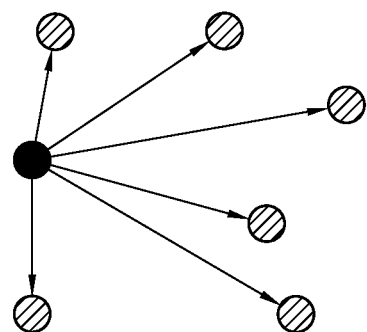
FIGS. 11A to 11C show three cast types, based on an embodiment of the present disclosure.
Figure 11B:
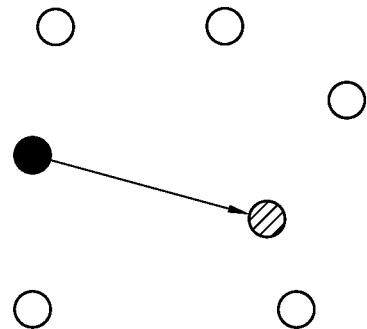
Figure 11C:
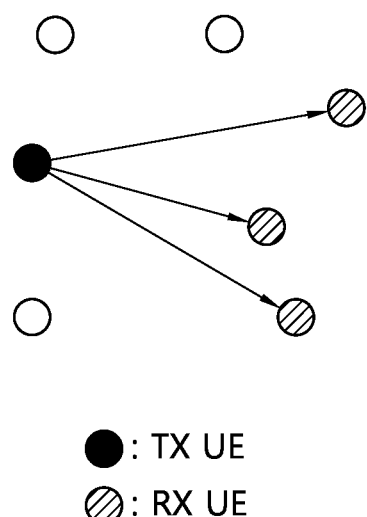

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows group-cast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) (or action(s)) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, Sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/ SSSS, and so on). Transmitting operation(s) may include transmitting operation(s) of WAN UL channel(s) and/or WAN UL signal(s) (e.g., PUSCH, PUCCH, SRS, and so on).

In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

FIG. 12 shows a method for determining transmission power by a first apparatus according to an embodiment of the present disclosure.

Total sidelink transmit power may be the same in symbols used for PSCCH and/or PSSCH transmission in one slot. For example, the maximum sidelink transmission power may be configured for a transmitting UE. For example, the maximum sidelink transmission power may be changed according to a priority related to PSCCH/PSSCH.

In Open-Loop Power Control, OLPC, a UE may use at least one of a downlink pathloss (PL) (e.g., PL between a transmitting UE and a base station) and/or a sidelink PL (e.g., a PL between a transmitting UE and a receiving UE). For example, in sidelink OLPC, a UE may be configured to use only downlink PL. For example, in sidelink OLPC, a UE may be configured to use only sidelink PL. For example, in sidelink OLPC, a UE may be configured to use both downlink PL and sidelink PL. In this case, a UE may determine the minimum value among a power value given by OLPC based on downlink PL and a power value given by OLPC based on sidelink PL as a power value. For example, parameters (e.g., PO and alpha value) used for power control may be separately configured for downlink PL and sidelink PL.

On the other hand, for example, under an environment in which SL communication is performed, when an SL pathloss (PL) based power control operation is configured for a transmitting UE, the transmitting UE may estimate an SL PL value based on information on an SL RSRP (e.g., an SL RSRP value) and/or information on SL PL (e.g., an SL PL value) reported by a receiving UE. For example, a transmitting UE may estimate an SL PL value between the transmitting UE and a receiving UE based on information on an SL RSRP and/or an SL PL reported by a receiving UE. In this disclosure, for example, an SL RSRP value may include an L1 SL RSRP value or an L3 SL RSRP value. In addition, a transmitting UE may determine its (final) transmit power value using an estimated SL PL value.

However, for example, depending on a link quality or channel state between a transmitting UE and a receiving UE, the transmitting UE may not be able to receive information on an SL RSRP and/or information on SL PL from the receiving UE. For example, a transmitting UE may not always successfully receive information on an SL RSRP and/or information on SL PL from a receiving UE. In this case, for example, a transmitting UE may determine/consider that an SL PL value is not available. In this case, for example, a problem may occur in that a transmitting UE cannot effectively or adaptively update an SL PL value between itself and a receiving UE according to the latest state (e.g., distance change).

Here, for example, the above-described problem may occur due to poor link quality or channel condition between a transmitting UE and a receiving UE. Or, for example, the above-described problem may occur when there is no packet/traffic for a transmitting UE to transmit to a receiving UE. For example, a transmitting UE may transmit an RS used by a receiving UE for SL RSRP or SL PL measurement by including (limitedly) in (data-related) PSSCH and related resources. However, when there is no packet/traffic for a transmitting UE to transmit to a receiving UE, the transmitting UE does not transmit an RS for the receiving UE to perform SL RSRP or SL PL measurement, the above-described problem may occur because the transmitting UE does not receive information on an SL RSRP or SL PL from the receiving UE.

Here, for example, when the above-described problem occurs, due to the increase in the distance between a transmitting UE and a receiving UE, the transmitting UE should actually or preferably increase the transmission power, but since the transmitting UE does not (successfully) receive information on SL RSRP or SL PL from the receiving UE, the transmitting UE may continue to use the transmission power derived based on the existing small SL PL value for sidelink transmission. This may lead to performance degradation of sidelink communication. In order to solve the above problem, a method for a UE to control transmission power and an apparatus supporting the same according to an embodiment of the present disclosure will be described below.

In step S1210, a first apparatus according to an embodiment of the present disclosure may determine a sidelink transmission power for transmission to a second apparatus as a first transmission power, based on related to at least one parameter related to sidelink pathloss (SL PL) and an Open-Loop Power Control (OLPC) parameter. In step S1220, a first apparatus according to an embodiment of the present disclosure may transmit a first physical sidelink control channel (PSCCH) or a first physical sidelink shared channel (PSSCH) to the second apparatus. In step S1230, a first apparatus according to an embodiment of the present disclosure may determine the sidelink transmission power as a second transmission power, based on that a transmission power control operation for the first transmission power is triggered. For example, the second transmission power may be the pre-configured maximum transmission power ($P_{CMAX}$). In step S1240, a first apparatus according to an embodiment of the present disclosure may transmit a second PSCCH or a second PSSCH to the second apparatus, based on the second transmission power.

According to an embodiment of the present disclosure, a transmission power control operation for a first transmission power may be triggered based on the following various embodiments and/or examples. For example, when at least one of the following predefined conditions or criteria is satisfied, a transmitting UE may disable an SL PL-based power control operation or an SL PL-based open-loop power control (OLPC) operation. For example, when at least one of the following predefined conditions or criteria is satisfied, a transmitting UE may not perform an SL PL-based power control operation or an SL PL-based OLPC operation. In this case, for example, a transmitting UE may determine/consider a specific transmit power value (e.g., a pre-configured transmit power value or a maximum transmit power value) as a transmit power value for sidelink transmission. In addition, a transmitting UE may perform sidelink transmission with a specific transmit power value. For example, a transmitting UE may perform sidelink transmission with a transmission power value used when performing broadcast communication. In the present disclosure, disabling an SL PL-based power control operation or an SL PL-based OLPC operation by a transmitting UE may include determining/considering a specific transmit power value as a transmit power value for sidelink transmission by the transmitting UE.

Alternatively, according to an embodiment of the present disclosure, when at least one of the following predefined conditions or criteria is satisfied, a transmitting UE may increase a transmit power by a pre-configured offset value. Alternatively, when at least one of the following predefined conditions or criteria is satisfied, a transmitting UE may reduce a transmit power to a pre-configured offset value. Alternatively, when at least one of the following predefined conditions or criteria is satisfied, an SL PL value may be 0. Alternatively, when at least one of the following predefined conditions or criteria is satisfied, an OLPC parameter, an SL PL value, and the like may be inherited to the previous value. Alternatively, when a carrier or BWP is changed, an SL PL value may be reconfigured.

Examples of predefined conditions or criteria are as follows.

One example is when a transmitting UE does not receive information on SL RSRP or SL PL more than a threshold number of times from a receiving UE. For example, this case may correspond to a case in which a transmitting UE cannot successfully or continuously receive information on SL RSRP or SL PL more than a threshold number of times from a receiving UE within a pre-configured time window.

And/or, another example is when a transmitting UE fails to transmit an RS used for SL RSRP measurement or SL PS measurement/reporting of a receiving UE more than a threshold number of times. For example, this case may correspond to a case in which a transmitting UE fails to transmit an RS used for SL RSRP measurement or SL PS measurement/reporting of a receiving UE within a pre-configured time window for more than a pre-configured threshold number of times.

And/or, another example is when a transmitting UE fails to receive information on SL RSRP or information on SL PL more than a pre-configured threshold number of times, from the time when the transmitting UE receives information on SL RSRP or information on SL PL, during a pre-configured timer or threshold time. For example, this case may correspond to a case in which a transmitting UE has not successfully or continuously received information on SL RSRP or information on SL PL for more than a pre-configured threshold number (e.g., 2), from the time when the transmitting UE successfully receives information on SL RSRP or information on SL PL, during a pre-configured timer or threshold time.

And/or, another example is when the number of times a transmitting UE has not continuously received information on SL RSRP or information on SL PL exceeds a pre-configured threshold. For example, this case may correspond to a case in which a receiving UE reports information on SL RSRP or SL PL to a transmitting UE based on a pre-configured period, and the number of times the transmitting UE fails to continuously receive information on SL RSRP or SL PL exceeds a pre-configured threshold.

And/or, another example is when a resource pool or a carrier or BWP used for sidelink communication between a transmitting UE and a receiving UE is changed or reconfigured.

And/or, another example is when a parameter related to SL OLPC is reconfigured. For example, a case in which a parameter related to a resource pool or a carrier-specific SL OLPC is reconfigured may correspond.

And/or, another example is when a change in an SL PL value exceeds a pre-configured threshold.

And/or, another example is a case in which a transmitting UE needs to perform sidelink communication on an exceptional pool.

And/or, another example is when a transmitting UE receives NACK information from a receiving UE more than a pre-configured threshold number of times. For example, there may be a case in which a transmitting UE continuously receives NACK information from a receiving UE more than a pre-configured threshold number within a pre-configured time window.

And/or, another example is when a transmitting UE fails to receive an SL HARQ feedback information from a receiving UE more than a pre-configured threshold number of times. For example, a case in which a transmitting UE continuously fails to receive an SL HARQ feedback information from a receiving UE more than a pre-configured threshold number of times may correspond to this case.

And/or, another example is when an RLF timer of a transmitting UE is operating.

For example, when a transmitting UE does not receive information about SL RSRP or SL PL more than a threshold number of times from a receiving UE, the transmitting UE may determine/consider the specific transmission power value as a transmission power value for sidelink transmission, or the transmitting UE may increase transmission power by adding a pre-configured offset value to the current transmission power.

And/or, for example, when a transmitting UE fails to transmit an RS used for SL RSRP measurement or SL PS measurement/reporting of a receiving UE more than a threshold number of times, the transmitting UE may determine/consider the specific transmission power value as a transmission power value for sidelink transmission, or the transmitting UE may increases transmission power by adding a preset offset value to the current transmission power, or the transmitting UE may reduce transmission power by subtracting a pre-configured offset value from the current transmission power.

And/or, for example, when a transmitting UE fails to receive information on SL RSRP or information on SL PL more than a pre-configured threshold number of times from the time when the transmitting UE receives information on SL RSRP or information on SL PL, during a pre-configured timer or threshold time, the transmitting UE may determine/consider the specific transmission power value as a transmission power value for sidelink transmission, or the transmitting UE may increase transmission power by adding a pre-configured offset value to the current transmission power.

And/or, for example, if the number of times a transmitting UE has not continuously received information on SL RSRP or information on SL PL exceeds a pre-configured threshold, the transmitting UE may determine/consider the specific transmission power value as a transmission power value for sidelink transmission, or the transmitting UE may increase transmission power by adding a pre-configured offset value to the current transmission power.

And/or, for example, when a resource pool or a carrier or BWP used for sidelink communication between a transmitting UE and a receiving UE is changed or reset, the transmitting UE may determine/consider the specific transmission power value as a transmission power value for sidelink transmission, or the transmitting UE may increases transmission power by adding a pre-configured offset value to the current transmission power, or the transmitting UE may reduce transmission power by subtracting a pre-configured offset value from the current transmission power.

And/or, for example, if a parameter related to SL OLPC is reconfigured, the transmitting UE may determine/consider the specific transmission power value as a transmission power value for sidelink transmission, or the transmitting UE may increases transmission power by adding a pre-configured offset value to the current transmission power, or the transmitting UE may reduce transmission power by subtracting a pre-configured offset value from the current transmission power.

And/or, for example, if a change in SL PL value exceeds a pre-configured threshold, the transmitting UE may determine/consider the specific transmission power value as a transmission power value for sidelink transmission, or the transmitting UE may increases transmission power by adding a preset offset value to the current transmission power, or the transmitting UE may reduce transmission power by subtracting a pre-configured offset value from the current transmission power.

And/or, for example, when a transmitting UE needs to perform sidelink communication on an exceptional pool, the transmitting UE may determine/consider the specific transmission power value as a transmission power value for sidelink transmission, or the transmitting UE may increases transmission power by adding a pre-configured offset value to the current transmission power, or the transmitting UE may reduce transmission power by subtracting a pre-configured offset value from the current transmission power.

And/or, for example, when a transmitting UE receives NACK information from the receiving UE more than a pre-configured threshold number of times, the transmitting UE may determine/consider the specific transmission power value as a transmission power value for sidelink transmission, or the transmitting UE may increases transmission power by adding a pre-configured offset value to the current transmission power.

And/or, for example, when a transmitting UE fails to receive an SL HARQ feedback information from a receiving UE more than a pre-configured threshold number of times, the transmitting UE may determine/consider the specific transmission power value as a transmission power value for sidelink transmission, or the transmitting UE may increases transmission power by adding a pre-configured offset value to the current transmission power.

And/or, for example, when an RLF timer of a transmitting UE is operating, the transmitting UE may determine/consider the specific transmission power value as a transmission power value for sidelink transmission, or the transmitting UE may increases transmission power by adding a pre-configured offset value to the current transmission power.

According to an embodiment of the present disclosure, a transmitting UE may efficiently determine a transmission power for sidelink transmission.

Figure 13:
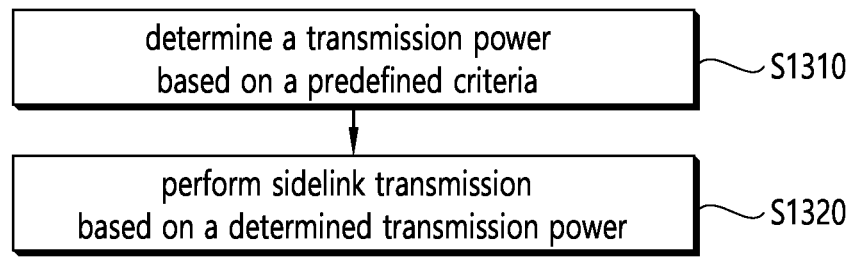
FIG. 13 shows a method of determining transmission power by a first apparatus according to another embodiment of the present disclosure.

FIG. 13 shows a method of determining transmission power by a first apparatus according to another embodiment of the present disclosure.

The embodiment of FIG. 13 may be combined with various methods and/or procedures proposed in the present disclosure.

Referring to FIG. 13, in step S1310, a first apparatus 100 may determine a transmission power based on a predefined criteria. For example, a first apparatus 100 may determine a transmit power based on predefined criteria according to various methods and/or procedures proposed in the present disclosure.

In step S1320, a first apparatus 100 may perform sidelink transmission based on a determined transmission power. For example, a first apparatus 100 may perform sidelink transmission with respect to a second apparatus 200 based on a determined transmission power.

The proposed method can be applied to an apparatus described below. For example, the proposed method may be performed by at least one of devices described in FIGS. 16 to 21. For example, a first apparatus 100 may be at least one of the devices described in FIGS. 16 to 21. For example, a second apparatus 200 may be at least one of the devices described in FIGS. 16 to 21.

First, a processor 102 of a first apparatus 100 may determine a transmission power based on a predefined criterion. In addition, a processor 102 of a first apparatus 100 may control a transceiver 106 to perform sidelink transmission based on a determined transmission power.

Figure 14:
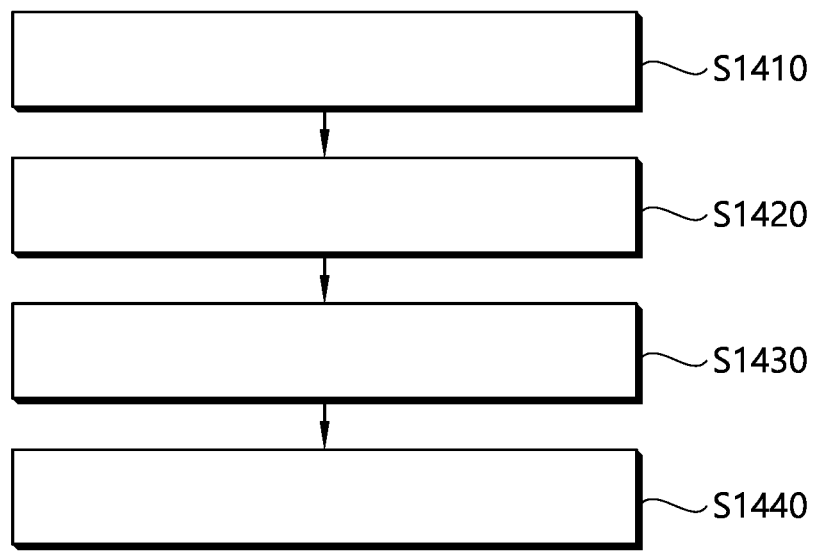
FIG. 14 is a flowchart showing an operation of a first apparatus according to an embodiment of the present disclosure.

FIG. 14 is a flowchart showing an operation of a first apparatus according to an embodiment of the present disclosure.

Operations disclosed in the flowchart of FIG. 14 may be performed in combination with various embodiments of the present disclosure. In one example, operations disclosed in the flowchart of FIG. 14 may be performed based on at least one of devices illustrated in FIGS. 16 to 21. In one example, a first apparatus of FIG. 14 may correspond to a first wireless device 100 of FIG. 17 to be described later. In another example, a first apparatus of FIG. 14 may correspond to a second wireless device 200 of FIG. 17 to be described later.

In step S1410, a first apparatus according to an embodiment of the present disclosure may determine a sidelink transmission power for transmission to a second apparatus as a first transmission power, based on an open-loop power control (OLPC) parameter and at least one parameter related to sidelink (SL) pathloss (PL).

In step S1420, a first apparatus according to an embodiment of the present disclosure may transmit a first physical sidelink control channel (PSCCH) or a first physical sidelink shared channel (PSSCH) to the second apparatus, based on the first transmission power.

In step S1430, a first apparatus according to an embodiment of the present disclosure may determine the sidelink transmission power as a second transmission power, based on that a transmission power control operation for the first transmission power is triggered.

In an embodiment, a first apparatus may fallback a sidelink transmission power to $P_{CMAX}$ when any one of pre-configured conditions is satisfied.

A first apparatus according to an embodiment of the present disclosure may set an SL PL value to 0 based on that a transmission power control operation for the first transmission power is triggered. Alternatively, a first apparatus may inherit an OLPC parameter, an SL PL value, and the like to a previous value based on that a transmission power control operation for the first transmission power is triggered. Alternatively, when a carrier or BWP is changed, a first apparatus may reset an SL PL value.

In step S1440, a first apparatus according to an embodiment of the present disclosure may transmit a second PSCCH or a second PSSCH to the second apparatus, based on the second transmission power.

In one embodiment, the second transmission power may be pre-configured.

In one embodiment, the step of determining the sidelink transmission power as the second transmission power may further include: resetting the OLPC parameter and the at least one parameter related to the SL PL, based on that the transmission power control operation for the first transmission power is triggered; and determining the sidelink transmission power as the second transmission power, based on that the OLPC parameter and the at least one parameter related to the SL PL are reset.

In one embodiment, the transmission power control operation for the first transmission power may be triggered, based on that at least one of a resource pool, a carrier, or a bandwidth part (BWP), used for sidelink communication between the first apparatus and the second apparatus is reconfigured.

In one embodiment, the transmission power control operation for the first transmission power may be triggered, based on that a pre-configured number of hybrid automatic repeat request (HARQ) negative acknowledgements (NACKs), related to the first PSSCH or the first PSSCH, are received from the second apparatus based on a physical sidelink feedback channel (PSFCH).

In one embodiment, the transmission power control operation for the first transmission power may be triggered, based on that a pre-configured number of HARQ NACKs, related to the first PSCCH or the first PSSCH, are continuously received from the second apparatus based on a PSFCH.

In one embodiment, the transmission power control operation for the first transmission power may be triggered, based on that reception of a pre-configured number of SL HARQ feedbacks, related to the first PSCCH or the first PSSCH, is failed. The SL HARQ feedbacks may be transmitted from the second apparatus to the first apparatus based on a PSFCH.

In one embodiment, the transmission power control operation for the first transmission power may be triggered, based on that reception of a pre-configured number of SL HARQ feedbacks, related to the first PSCCH or the first PSSCH, is continuously failed. The SL HARQ feedbacks may be transmitted from the second apparatus to the first apparatus based on a PSFCH.

In one embodiment, the transmission power control operation for the first transmission power may be triggered, based on that the OLPC parameter is re-configured by a base station.

In one embodiment, the transmission power control operation for the first transmission power may be triggered, based on that a pre-configured number of SL reference signal received power (RSRP) values, related to the first PSCCH or the first PSSCH, are not received from the second apparatus.

In one embodiment, the transmission power control operation for the first transmission power may be triggered, based on that a pre-configured number of reference signals (RSs) are not transmitted to the second apparatus through the first PSCCH or the first PSSCH. The RSs may be for measurement of SL RSRP by the second apparatus.

According to an embodiment of the present disclosure, a first apparatus for performing sidelink communication may be proposed. The first apparatus may comprise: one or more memories storing instructions; one or more transceivers; and one or more processors connected to the one or more memories and the one or more transceivers, wherein the one or more processors execute the instructions to: determine a sidelink transmission power for transmission to a second apparatus as a first transmission power, based on an open-loop power control (OLPC) parameter and at least one parameter related to sidelink (SL) pathloss (PL); transmit a first physical sidelink control channel (PSCCH) or a first physical sidelink shared channel (PSSCH) to the second apparatus, based on the first transmission power; determine the sidelink transmission power as a second transmission power, based on that a transmission power control operation for the first transmission power is triggered; and transmit a second PSCCH or a second PSSCH to the second apparatus, based on the second transmission power.

According to an embodiment of the present disclosure, an apparatus (or a chip(set)) configured to control a first user equipment (UE) may be proposed. The apparatus may comprise: one or more processors; and one or more memories operably connectable to the one or more processors and storing instructions, wherein the one or more processors execute the instructions to: determine a sidelink transmission power for transmission to a second UE as a first transmission power, based on an open-loop power control (OLPC) parameter and at least one parameter related to sidelink (SL) pathloss (PL); transmit a first physical sidelink control channel (PSCCH) or a first physical sidelink shared channel (PSSCH) to the second UE, based on the first transmission power; determine the sidelink transmission power as a second transmission power, based on that a transmission power control operation for the first transmission power is triggered; and transmit a second PSCCH or a second PSSCH to the second UE, based on the second transmission power.

In one example, a first apparatus of the embodiment may refer to a first apparatus described in the first half of the present disclosure. In one example, the at least one processor, the at least one memory, etc. in the apparatus for controlling the first UE may be implemented as separate sub-chips, respectively, or at least two or more components may be implemented through one sub-chip.

According to an embodiment of the present disclosure, a non-transitory computer-readable storage medium storing instructions may be proposed. The instructions may, when executed, cause a first apparatus to: determine a sidelink transmission power for transmission to a second apparatus as a first transmission power, based on an open-loop power control (OLPC) parameter and at least one parameter related to sidelink (SL) pathloss (PL); transmit a first physical sidelink control channel (PSCCH) or a first physical sidelink shared channel (PSSCH) to the second apparatus, based on the first transmission power; determine the sidelink transmission power as a second transmission power, based on that a transmission power control operation for the first transmission power is triggered; and transmit a second PSCCH or a second PSSCH to the second apparatus, based on the second transmission power.

Figure 15:
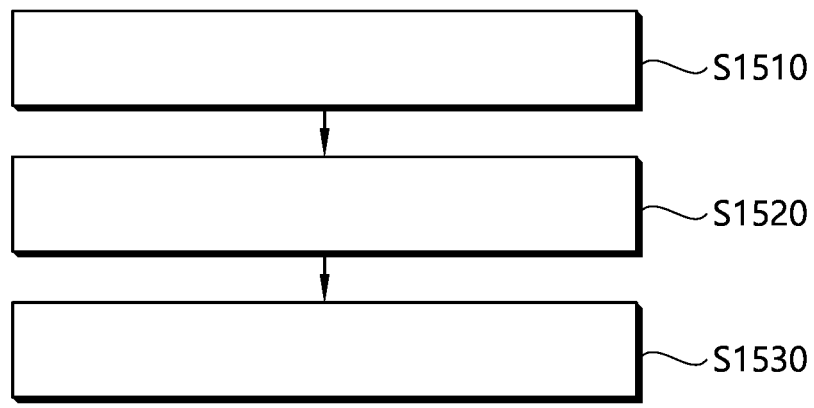
FIG. 15 is a flowchart showing an operation of a second apparatus according to an embodiment of the present disclosure.

FIG. 15 is a flowchart showing an operation of a second apparatus according to an embodiment of the present disclosure.

Operations disclosed in the flowchart of FIG. 15 may be performed in combination with various embodiments of the present disclosure. In one example, operations disclosed in the flowchart of FIG. 15 may be performed based on at least one of devices illustrated in FIGS. 16 to 21. In one example, a second apparatus of FIG. 15 may correspond to a second wireless device 200 of FIG. 17 to be described later. In another example, a second apparatus of FIG. 15 may correspond to a first wireless device 100 of FIG. 17 to be described later.

In step S1510, a second apparatus according to an embodiment of the present disclosure may receive a first physical sidelink control channel (PSCCH) or a first physical sidelink shared channel (PSSCH) based on a first transmission power, from a first apparatus.

In step S1520, a second apparatus according to an embodiment of the present disclosure may transmit a physical sidelink feedback channel (PSFCH) related to the first PSCCH or the first PSSCH, to the first apparatus.

In step S1530, a second apparatus according to an embodiment of the present disclosure may receive a second PSSCH or a second PSSCH relate to a second transmission power, from the first apparatus.

In one embodiment, the first transmission power may be determined by the first apparatus based on at least one parameter related to a sidelink pathloss (SL PL) and an OLPC parameter.

In one embodiment, the second transmission power may be determined by the first apparatus based on that a transmission power control operation for the first transmission power is triggered In one embodiment, the second transmission power may be pre-configured.

In one embodiment, the step of determining the sidelink transmission power as the second transmission power may further include: resetting the OLPC parameter and the at least one parameter related to the SL PL, based on that the transmission power control operation for the first transmission power is triggered; and determining the sidelink transmission power as the second transmission power, based on that the OLPC parameter and the at least one parameter related to the SL PL are reset.

In one embodiment, the transmission power control operation for the first transmission power may be triggered, based on that at least one of a resource pool, a carrier, or a bandwidth part (BWP), used for sidelink communication between the first apparatus and the second apparatus is reconfigured.

In one embodiment, the transmission power control operation for the first transmission power may be triggered, based on that a pre-configured number of hybrid automatic repeat request (HARQ) negative acknowledgements (NACKs), related to the first PSCCH or the first PSSCH, are received from the second apparatus based on a physical sidelink feedback channel (PSFCH).

In one embodiment, the transmission power control operation for the first transmission power may be triggered, based on that a pre-configured number of HARQ NACKs, related to the first PSCCH or the first PSSCH, are continuously received from the second apparatus based on a PSFCH.

In one embodiment, the transmission power control operation for the first transmission power may be triggered, based on that reception of a pre-configured number of SL HARQ feedbacks, related to the first PSCCH or the first PSSCH, is failed. The SL HARQ feedbacks may be transmitted from the second apparatus to the first apparatus based on a PSFCH.

In one embodiment, the transmission power control operation for the first transmission power may be triggered, based on that reception of a pre-configured number of SL HARQ feedbacks, related to the first PSCCH or the first PSSCH, is continuously failed. The SL HARQ feedbacks may be transmitted from the second apparatus to the first apparatus based on a PSFCH.

In one embodiment, the transmission power control operation for the first transmission power may be triggered, based on that the OLPC parameter is reset by a base station.

In one embodiment, the transmission power control operation for the first transmission power may be triggered, based on that a pre-configured number of SL reference signal received power (RSRP) values, related to the first PSCCH or the first PSSCH, are not received from the second apparatus.

In one embodiment, the transmission power control operation for the first transmission power may be triggered, based on that a pre-configured number of reference signals (RSs) are not transmitted to the second apparatus through the first PSCCH or the first PSSCH. The RSs may be for measurement of SL RSRP by the second apparatus.

According to an embodiment of the present disclosure, a second apparatus for performing sidelink communication may be proposed. The second apparatus may comprise: one or more memories storing instructions; one or more transceivers; and one or more processors connected to the one or more memories and the one or more transceivers, wherein the one or more processors execute the instructions to: receive a first physical sidelink control channel (PSCCH) or a first physical sidelink shared channel (PSSCH) based on a first transmission power, from a first apparatus; transmit a physical sidelink feedback channel (PSFCH) related to the first PSCCH or the first PSSCH, to the first apparatus; and receive a second PSSCH or a second PSSCH relate to a second transmission power, from the first apparatus, wherein the first transmission power is determined by the first apparatus based on an open-loop power control (OLPC) parameter and at least one parameter related to sidelink (SL) pathloss(PL), and wherein the second transmission power is determined by the first apparatus based on that a transmission power control operation for the first transmission power is triggered.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between UEs. In this case, a base station, a relay node, or the like may use the proposed method according to various embodiments of the present disclosure. For example, it may be defined that information on whether to apply the method according to various embodiments of the present disclosure is reported by the base station to the UE or by a transmitting UE to a receiving UE through pre-defined signaling (e.g., physical layer signaling or higher layer signaling). For example, it may be defined that information on a rule according to various embodiments of the present disclosure is reported by the base station to the UE or by a transmitting UE to a receiving UE through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
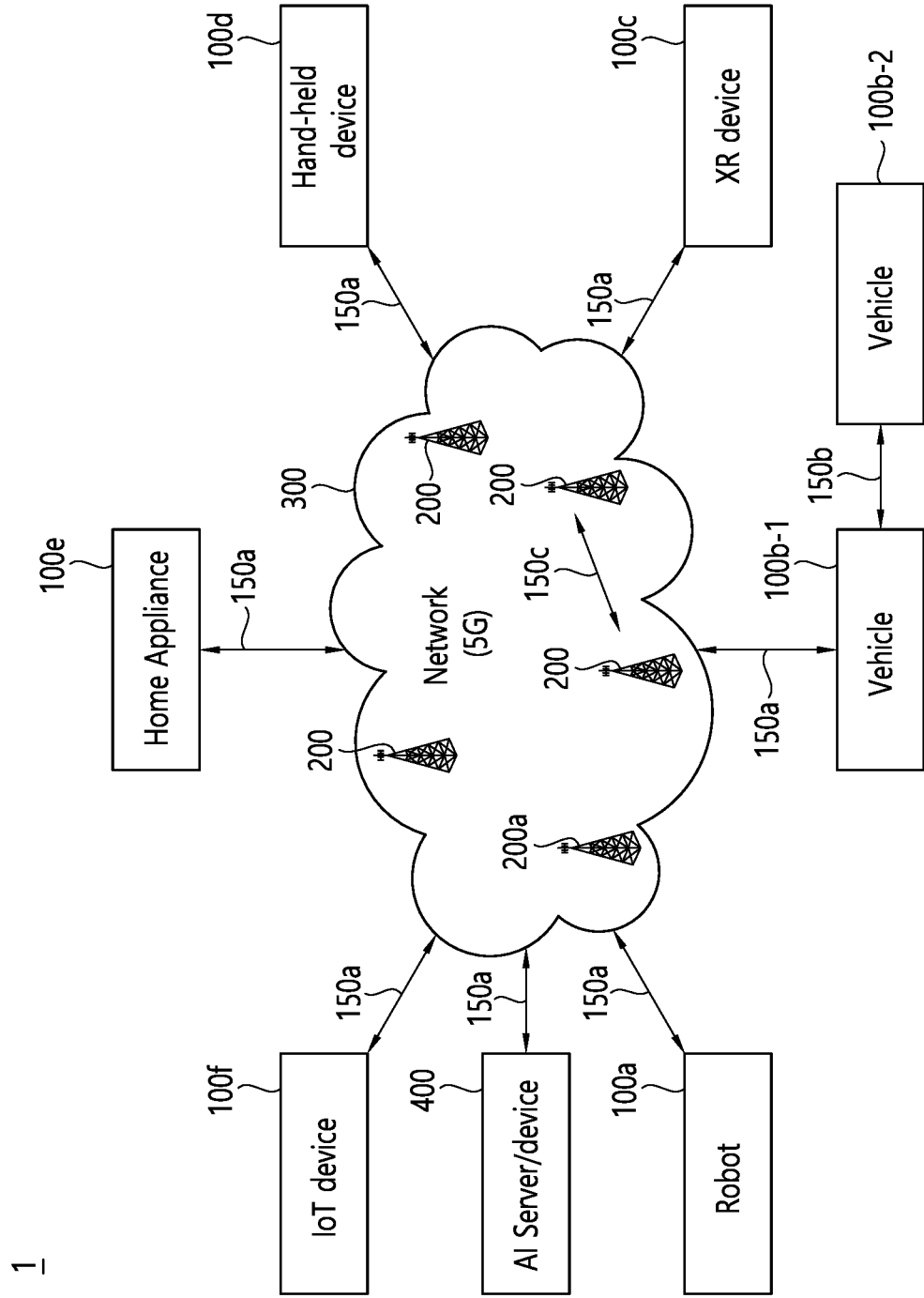
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
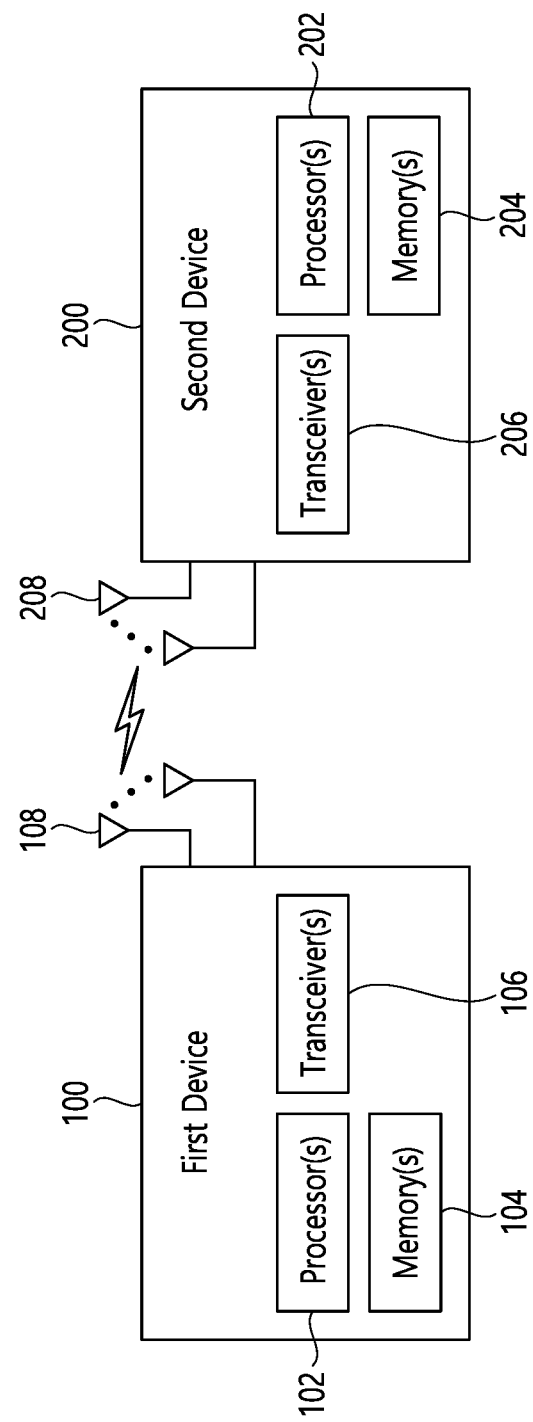
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
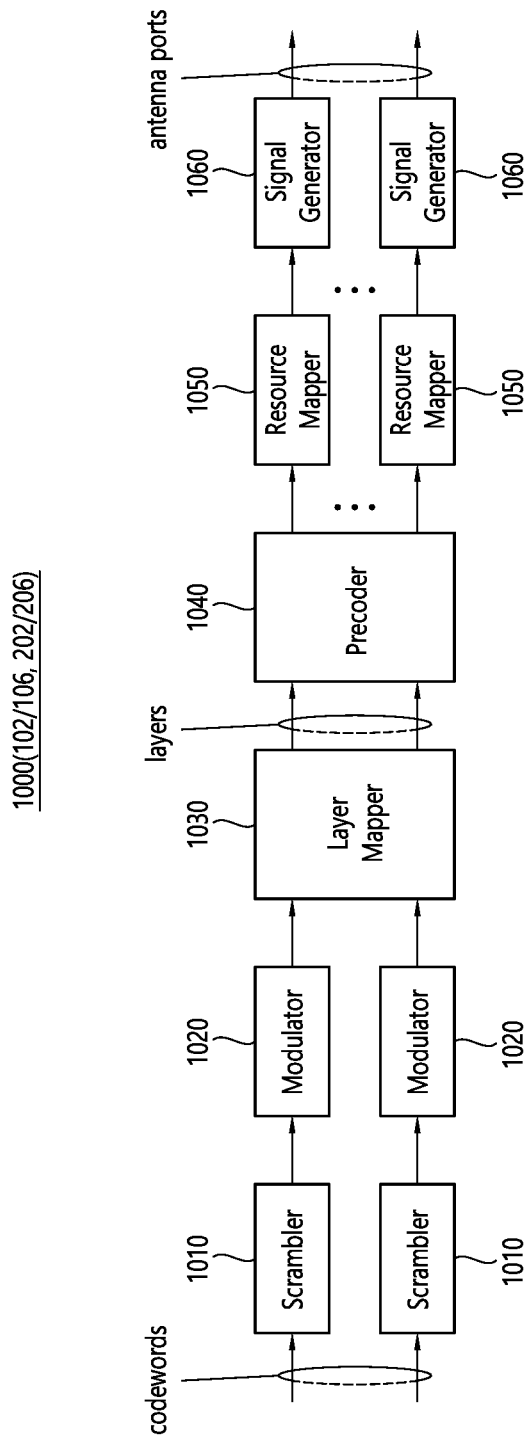
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
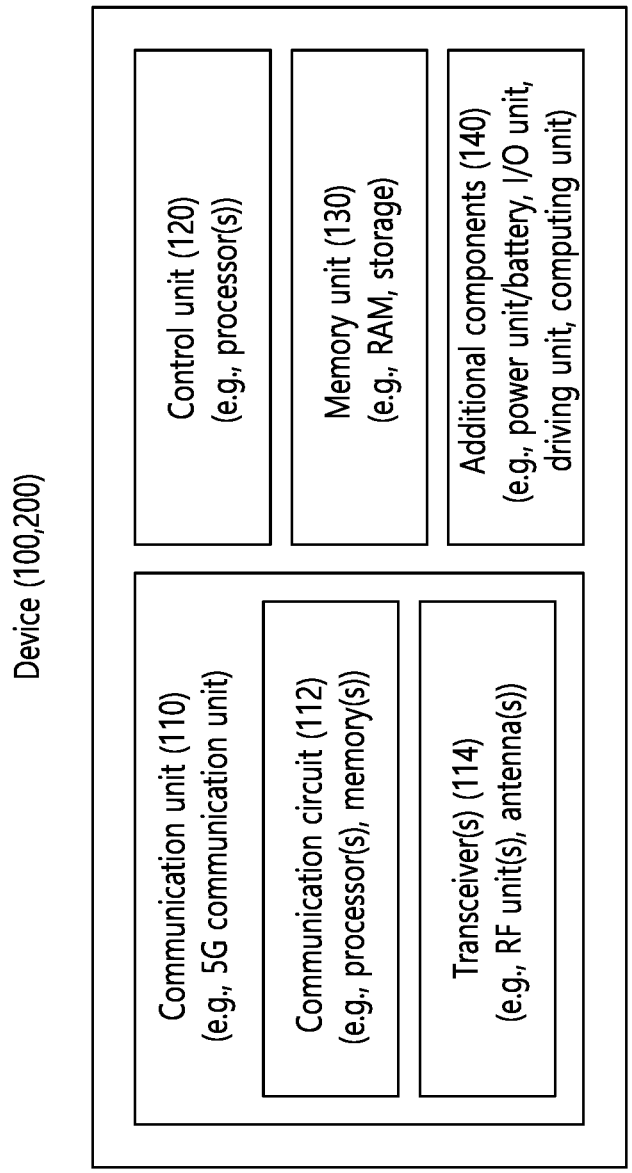
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
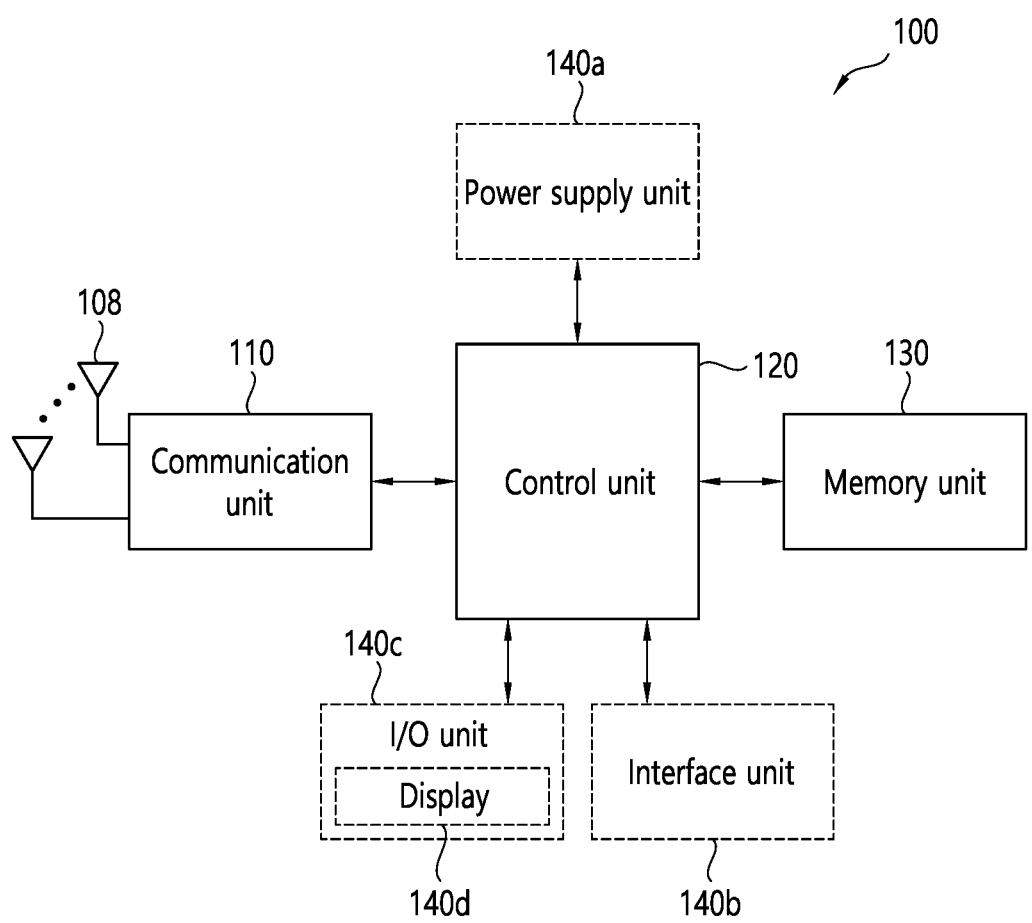
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
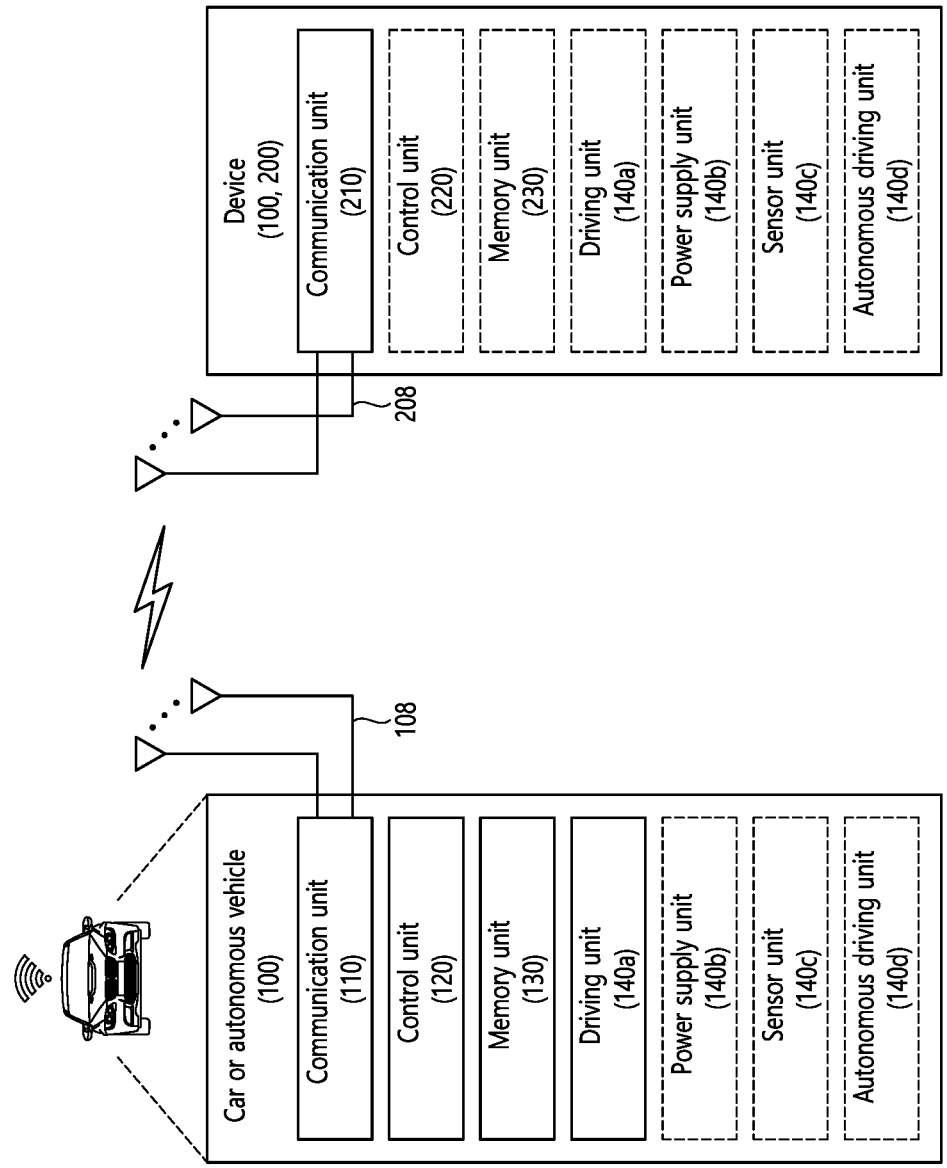
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
    determining an inter-device transmission power for transmission to a second device as a first transmission power, based on an open-loop power control parameter and at least one parameter related to inter-device pathloss;
    transmitting a first inter-device physical control channel or a first inter-device physical shared channel to the second device, based on the first transmission power;
    determining the inter-device transmission power as a second transmission power, based on a transmission power control operation for the first transmission power being triggered; and
    transmitting a second inter-device physical control channel or a second inter-device physical shared channel to the second device, based on the second transmission power,
    wherein the transmission power control operation for the first transmission power is triggered, based on a pre-configured number of inter-device reference signal received power values, related to the first inter-device physical control channel or the first inter-device physical shared channel, being not received from the second device.

2. The method of claim 1, wherein the second transmission power is pre-configured.

3. The method of claim 2, wherein the step of determining the inter-device transmission power as the second transmission power further includes:
    resetting the open-loop power control parameter and the at least one parameter related to the inter-device pathloss, based on the transmission power control operation for the first transmission power being triggered; and
    determining the inter-device transmission power as the second transmission power, based on the open-loop power control parameter and the at least one parameter related to the inter-device pathloss being reset.

4. The method of claim 1, wherein the transmission power control operation for the first transmission power is triggered, based on at least one of a resource pool, a carrier, or a bandwidth part, used for inter-device communication between the first device and the second device being reconfigured.

5. The method of claim 1, wherein the transmission power control operation for the first transmission power is triggered, based on a pre-configured number of negative feedbacks, related to the first inter-device physical shared channel or the first inter-device physical shared channel, being received from the second device based on an inter-device physical feedback channel.

6. The method of claim 1, wherein the transmission power control operation for the first transmission power is triggered, based on a pre-configured number of negative feedbacks, related to the first inter-device physical control channel or the first inter-device physical shared channel, being continuously received from the second device based on an inter-device physical feedback channel.

7. The method of claim 1, wherein the transmission power control operation for the first transmission power is triggered, based on a reception of a pre-configured number of inter-device feedbacks, related to the first inter-device physical control channel or the first inter-device physical shared channel, being failed, and wherein the inter-device feedbacks are transmitted from the second device to the first device based on an inter-device physical feedback channel.

8. The method of claim 1, wherein the transmission power control operation for the first transmission power is triggered, based on a reception of a pre-configured number of inter-device feedbacks, related to the first inter-device physical control channel or the first inter-device physical shared channel, being continuously failed, and
wherein the inter-device feedbacks are transmitted from the second device to the first device based on an inter-device physical feedback channel.

9. The method of claim 1, wherein the transmission power control operation for the first transmission power is triggered, based on the open-loop power control parameter being reset by a base station.

10. The method of claim 1, wherein the pre-configured number of inter-device reference signal received power values are not received from the second device, based on a pre-configured number of reference signals being not transmitted to the second device through the first inter-device physical control channel or the first inter-device physical shared channel, and
wherein the reference signals are for measurement of inter-device reference signal received power by the second device.

11. A first device for performing wireless communication, the first device comprising:
one or more memories storing instructions;
one or more transceivers; and
one or more processors connected to the one or more memories and the one or more transceivers, wherein the one or more processors execute the instructions to:
determine an inter-device transmission power for transmission to a second device as a first transmission power, based on an open-loop power control parameter and at least one parameter related to inter-device pathloss;
transmit a first inter-device physical control channel or a first inter-device physical shared channel to the second device, based on the first transmission power;
determine the inter-device transmission power as a second transmission power, based on a transmission power control operation for the first transmission power being triggered; and
transmit a second inter-device physical control channel or a second inter-device physical shared channel to the second device, based on the second transmission power,
wherein the transmission power control operation for the first transmission power is triggered, based on a pre-configured number of inter-device reference signal received power values, related to the first inter-device physical control channel or the first inter-device physical shared channel, being not received from the second device.

12. An device configured to control a first user equipment (UE), the device comprising:
one or more processors; and
one or more memories operably connectable to the one or more processors and storing instructions, wherein the one or more processors execute the instructions to:
determine an inter-UE transmission power for transmission to a second UE as a first transmission power, based on an open-loop power control parameter and at least one parameter related to inter-UE pathloss;
transmit a first inter-UE physical control channel or a first inter-UE physical shared channel to the second UE, based on the first transmission power;
determine the inter-UE transmission power as a second transmission power, based on a transmission power control operation for the first transmission power being triggered; and
transmit a second inter-UE physical control channel or a second inter-UE physical shared channel to the second UE, based on the second transmission power,
wherein the transmission power control operation for the first transmission power is triggered, based on a pre-configured number of inter-UE reference signal received power values, related to the first inter-UE physical control channel or the first inter-UE physical shared channel, being not received from the second UE.

* * * * *